United States Patent
Youn et al.

(10) Patent No.: US 6,791,685 B2
(45) Date of Patent: Sep. 14, 2004

(54) OPTICAL SIGNAL PERFORMANCE MONITORING APPARATUS AND METHOD IN MULTI-CHANNEL OPTICAL TRANSMISSION SYSTEM

(75) Inventors: Ji-wook Youn, Daejon (KR); Kwang-joon Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 291 days.

(21) Appl. No.: 10/066,092

(22) Filed: Jan. 31, 2002

(65) Prior Publication Data

US 2003/0112433 A1 Jun. 19, 2003

(30) Foreign Application Priority Data

Dec. 13, 2001 (KR) ........................................ 2001-78955

(51) Int. Cl.[7] .................................................. G01J 3/28
(52) U.S. Cl. ...................... 356/327; 356/328; 356/334; 398/26; 398/34; 398/37
(58) Field of Search ................................. 356/327, 328, 356/334, 331; 385/37, 24, 17, 18; 398/26, 34, 37

(56) References Cited

U.S. PATENT DOCUMENTS

| | | | | |
|---|---|---|---|---|
| 3,069,967 A | * | 12/1962 | White et al. ................ | 356/334 |
| 5,233,405 A | * | 8/1993 | Wildnauer et al. .......... | 356/333 |
| 5,986,782 A | * | 11/1999 | Alexander et al. ............ | 398/26 |
| 6,263,134 B1 | * | 7/2001 | Laude .......................... | 385/37 |
| 6,636,306 B2 | * | 10/2003 | He et al. ..................... | 356/327 |
| 6,654,561 B1 | * | 11/2003 | Terahara et al. .............. | 398/26 |

* cited by examiner

*Primary Examiner*—Frank G. Font
*Assistant Examiner*—Layla Lauchman
(74) *Attorney, Agent, or Firm*—Blakely Sokoloff Taylor & Zafman

(57) ABSTRACT

An optical signal performance monitoring apparatus in a multi-channel optical transmission system and a method for monitoring the optical signal performance. The optical signal performance monitoring apparatus in the multi-channel optical transmission system includes an optical input unit for controlling the spot size of an inputted multi-channel optical signal and generating a $1^{st}$ multi-channel beam; a diffraction and reflection unit for diffracting and reflecting the $1^{st}$ multi-channel beam; and generating a $2^{nd}$ multi-channel beam which is divided by wavelength and is in parallel with the $1^{st}$ multi-channel beam; an optical collimation and concentration unit for collimating the $1^{st}$ multi-channel beam and concentrating the $2^{nd}$ multi-channel beam which is divided by wavelength; and an optical detection unit for measuring the intensity of the $2^{nd}$ multi-channel beam focused by wavelength, and measuring the optical signal-to-noise ratio by measuring the optical intensity corresponding to each wavelength and an amplified spontaneous emission (ASE) noise strength at a point between optical signals.

8 Claims, 5 Drawing Sheets

OPTICAL SIGNAL PERFORMANCE MONITORING APPARATUS AND METHOD IN MULTI-CHANNEL OPTICAL TRANSMISSION SYSTEM

BACKGROUND OF THE INVENTION

1. Field of the Invention

The present invention relates to a multi-channel optical transmission system, and more particularly, to an apparatus and a method for monitoring each channel performance of a multi-channel optical signal in the multi-channel optical transmission system.

2. Description of the Related Art

An existing multi-channel optical transmission system is operated by a point-to-point transmission method so that multi-channel optical signals are transmitted through the same transmission line in the system. Each of the multi-channel optical signals has identical transmission line characteristics and transmission loss. However, a current multi-channel optical transmission system is changing to a point-to-multipoint transmission which adopts an optical add drop multiplexer and an optical cross connector. In the multi-channel optical transmission system using the point-to-multipoint transmission method, the multi-channel optical signals are coupled/branched in the state of optical signal at each node. That is, since each of the multi-channel optical signals experiences different transmission distances and transmission line characteristics by channels, the optical performance of each channel is not the same. To guarantee the same transmission performance in the multi-channel optical transmission system, each node should have the capability to monitor the performance of the multi-channel optical signals, that is, the intensity, the wavelength and the optical signal-to-noise ratio in the state of optical signal of each channel.

As solutions to monitoring of optical performance by channels in the multi-channel optical transmission system, an arrayed waveguide grating (U.S. Pat. No. 5,986,782), an optical fiber brag grating (U.S. Pat. No. 5,995,255) and a diffraction grating (K. Otsuka, ECOC97, pp. 147–150) are studied. However, the above solutions have limits in measuring the optical signal-to-noise ratio of each channel in a large-capacity multi-channel optical transmission system including the optical add drop multiplexer and the optical cross connector. Especially, the above methods cannot measure the optical signal-to-noise ratio and the wavelength of each channel simultaneously. In addition, in case of an existing optical performance monitoring apparatus using the diffraction grating, the size becomes too large, and the polarization-dependence and the aberration become high when the system is used to obtain the high resolving power used in measuring the optical signal performance.

SUMMARY OF THE INVENTION

To solve the above-described problems, it is an object of the present invention to provide an optical signal performance monitoring apparatus in a multi-channel optical transmission system, which has a high resolving power and minimizes an aberration and a polarization-dependence.

It is another object of the present invention to provide a method for monitoring an optical signal performance, which is performed in the optical signal performance monitoring apparatus.

To achieve the above object, an optical signal performance monitoring apparatus in a multi-channel optical transmission system includes:

an optical input unit for controlling the spot size of an inputted multi-channel optical signal and generating the $1^{st}$ multi-channel beam;

an optical collimation and focusing unit for collimating the $1^{st}$ multi-channel beam and focusing the $2^{nd}$ multi-channel beam which is divided by wavelength;

a diffraction and reflection unit for diffracting and reflecting the $1^{st}$ collimated multi-channel beam, and generating the $2^{nd}$ multi-channel beam which is divided by wavelength and is in parallel with the $1^{st}$ collimated multi-channel beam; and an optical detection unit for measuring the intensity of the $2^{nd}$ multi-channel beam by wavelength, which is focused by wavelength by the optical collimation and focusing unit.

To achieve another objective, a method for monitoring an optical signal performance in the multi-channel optical transmission system includes:

(a) step of controlling the spot size of an inputted multi-channel optical signal and generating the $1^{st}$ multi-channel beam;

(b) step of collimating the $1^{st}$ multi-channel beam;

(c) step of diffracting and reflecting the $1^{st}$ collimated multi-channel beam, and generating the $2^{nd}$ multi-channel beam which is divided by wavelength and is in parallel with the $1^{st}$ collimated multi-channel beam on the same plane; and (d) step of focusing the $2^{nd}$ multi-channel beam, measuring the intensity of the $2^{nd}$ multi-channel beam focused by wavelength, and measuring the optical signal-to-noise ratio by measuring the optical intensity corresponding to each wavelength and an amplified spontaneous emission (ASE) noise strength at the point between optical signals.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

An optical signal performance monitoring apparatus and a method in a multi-channel optical transmission system will be described below with reference to accompanying drawings.

Figure 1:
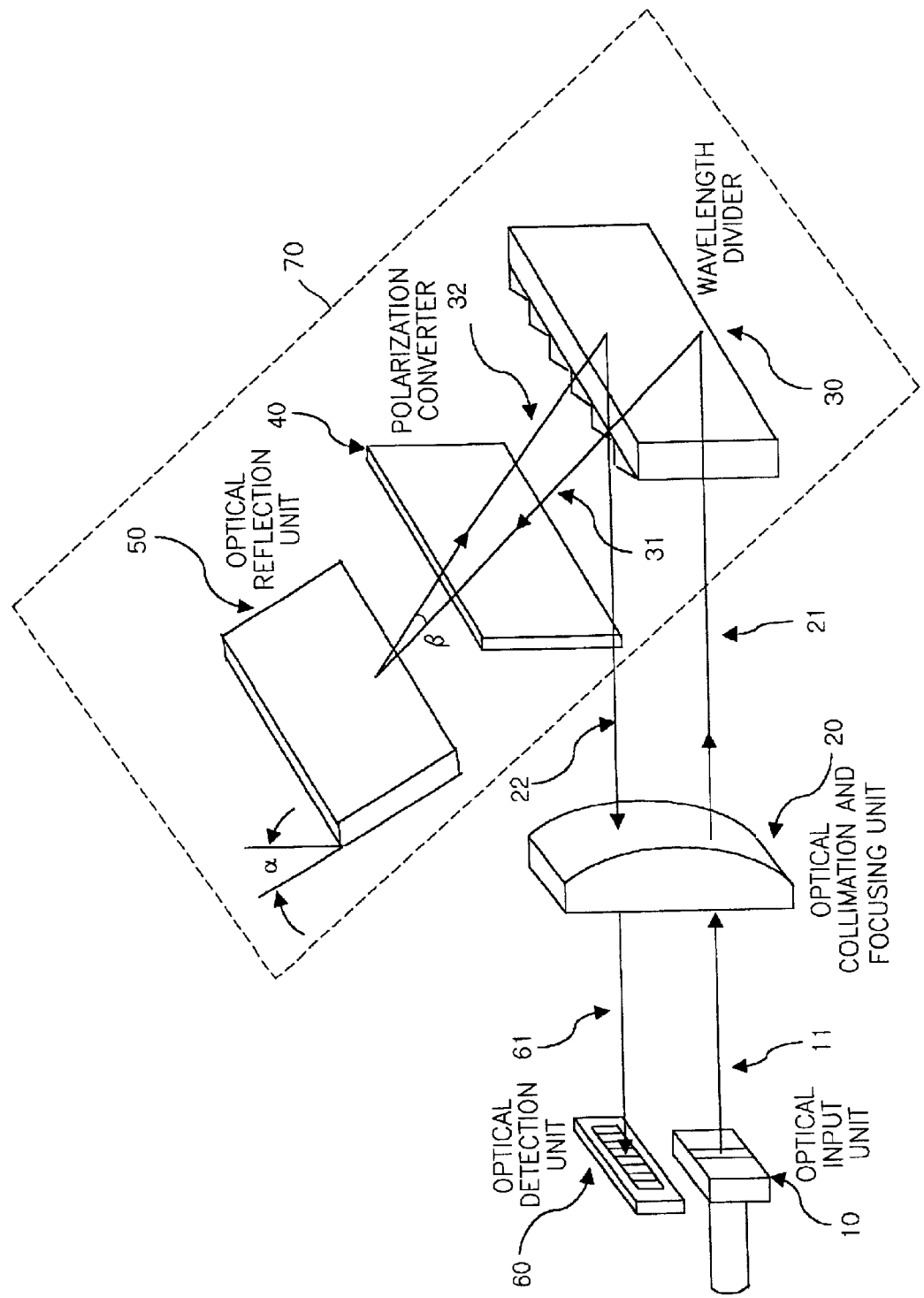
FIG. 1 is a block diagram showing one embodiment of an optical signal performance monitoring apparatus according to the present invention.

FIG. 1 is a block diagram showing one embodiment of the optical signal performance monitoring apparatus according to the present invention. The optical signal performance monitoring apparatus includes an optical input unit 10, an optical collimation and focusing unit 20, a diffraction and reflection unit 70 and an optical detection unit 60.

Referring to FIG. 1, the optical input unit 10 controls the spot size of the inputted multi-channel optical signal and generates the $1^{st}$ multi-channel beam 11. In line with the optical signal spot size controlled by the optical input unit 10, the spot size of the $2^{nd}$ focused multi-channel beam 61 inputted to the optical detection unit 60 is controlled.

The optical collimation and focusing unit 20 collimates the $1^{st}$ multi-channel beam 11 and focuses the $2^{nd}$ multi-channel beam 22 which is generated by the diffraction and reflection unit 70 and divided by wavelength.

The diffraction and reflection unit 70 receives the $1^{st}$ multi-channel beam 21 collimated by the optical collimation and focusing unit 20, and generates the $2^{nd}$ multi-channel beam 22 which is divided by wavelength and is in parallel with the $1^{st}$ collimated multi-channel beam 21. To be more specific, the diffraction and reflection unit 70 includes a wavelength divider 30, a polarization converter 40 and an optical reflection unit 50.

The wavelength divider 30 divides and diffracts the $1^{st}$ multi-channel beam 21 collimated by the optical collimation and focusing unit 20 by wavelength, and generates the $3^{rd}$ multi-channel beam 31. In addition, the wavelength divider 30 divides and diffracts the multi-channel beam 32 by wavelength, which is incident from the polarization converter 40. Then, the wavelength divider 30 generates the $2^{nd}$ multi-channel beam 22 which is in parallel with the $1^{st}$ collimated multi-channel beam 21. That is, the surface of the wavelength divider 30 is the diffraction grating designed to divide and reflect or diffract the incident light by wavelength. Therefore, the wavelength divider 30 can divide and diffract the waveform in the time area into multiple waveforms in the frequency area.

The polarization converter 40 changes the state of polarization of the $3^{rd}$ multi-channel beam 31 which is diffracted by the wavelength divider 30 and is incident on the optical reflection unit 50. In addition, the polarization converter 40 changes the state of polarization of the multi-channel beam which is reflected by the optical reflection unit 50 and is incident on the wavelength divider 30. As the polarization converter 40 is a phase delay element and is used to reduce the polarization dependence loss of the wavelength divider 30 and has a quarter wave plate. That is, whenever the beam passes through the quarter wave plate, the state of polarization of the beam is changed by 45 degrees. For example, when the $3^{rd}$ multi-channel beam 31 diffracted by the wavelength divider 30 is incident on the optical reflection unit 50, the polarization converter 40 changes the state of polarization of the $3^{rd}$ multi-channel beam 31 by 45 degrees. Further, when the $3^{rd}$ multi-channel beam 31 is reflected by the optical reflection unit 50 and is incident on the wavelength divider 30, the polarization converter 40 changes the state of polarization of the multi-channel beam by 45 degrees again. As a result, the state of polarization of the multi-channel beam 32 incident on the wavelength divider 30 is different from that of the $3^{rd}$ multi-channel beam 31 by 90 degrees. Therefore, the polarization dependence loss of the wavelength divider 30 can be reduced.

Since the optical reflection unit 50 is titled by a certain angle with regard to the propagation path of the $3^{rd}$ multi-channel beam 31, it reflects the incident multi-channel beam after changing the propagation path of the multi-channel beam. To be more specific, the optical reflection unit 50 is a plane mirror and is titled by $\alpha$ with regard to the $3^{rd}$ incident multi-channel beam 31. Due to the tilt, the $3^{rd}$ multi-channel beam 31 incident from the polarization converter 40 is reflected by the angle of $\beta$, and then incident on the polarization converter 40 again. The optical reflection unit 50 will be described in detail with reference to FIG. 2.

The optical detection unit 60 can measure the intensity, the wavelength and the optical signal-to-noise ratio of each channel of the multi-channel optical signal by measuring each wavelength intensity of the $2^{nd}$ multi-channel beam 61 which is focused by wavelength by the optical collimation and focusing unit 20. By doing so, the optical detection unit 60 can measure the performance of the optical signal. The optical detection unit 60 will be described in detail with reference to FIG. 5.

As shown in FIG. 1, the optical input unit 10 controls the spot size of the inputted multi-channel optical signal and generates the $1^{st}$ multi-channel beam 11. The optical collimation and focusing unit 20 collimates the $1^{st}$ multi-channel beam 11. The diffraction and reflection unit 70 diffracts and reflects the $1^{st}$ collimated multi-channel beam 21 and generates the $2^{nd}$ multi-channel beam 22 which is divided by wavelength and is in parallel with the $1^{st}$ collimated multi-channel beam 21 on the same plane.

To be more specific, the wavelength divider 30 divides and diffracts the $1^{st}$ collimated multi-channel beam 21 by wavelength and generates the $3^{rd}$ multi-channel beam 31. The $3^{rd}$ multi-channel beam 31 is incident on the optical reflection unit 50 after passing through the polarization converter 40. The $3^{rd}$ multi-channel beam is reflected by the angle of $\beta$ by the optical reflection unit 50 which is tilted by $\alpha$, then is incident on the wavelength divider 30 after passing through the polarization converter 40. As described above, the polarization converter 40 has the quarter wave plate. Whenever the $3^{rd}$ multi-channel beam 31 passes through the polarization converter 40, the state of polarization of the $3^{rd}$ multi-channel beam 31 is changed by 45 degrees. As a result, the state of polarization of the multi-channel beam 32 incident on the wavelength divider 30 is different from that of the $3^{rd}$ multi-channel beam 31 by 90 degrees.

The wavelength divider 30 divides and diffracts the multi-channel beam 32 by wavelength and generates the $2^{nd}$ multi-channel beam 22 which is divided by wavelength and is in parallel with the $1^{st}$ collimated multi-channel beam 21 on the same plane.

The optical collimation and focusing unit 20 focuses the $2^{nd}$ multi-channel beam 22. The optical detection unit 60 measures the intensity of the $2^{nd}$ multi-channel beam 61 focused by the optical collimation and focusing unit 20 by wavelength. In addition, the optical detection unit 60 measures the optical signal-to-noise ratio by measuring the optical intensity of each wavelength and an amplified spontaneous emission (ASE) noise strength between optical signals of each wavelength.

As described above, the multi-channel beam (incident to the diffraction and reflection unit 70 from the optical collimation and focusing unit 20) becomes in parallel with the multi-channel beam reflected to the optical collimation and focusing unit 20 from the diffraction and reflection unit 70 by the optical reflection unit 50 which is titled by predetermined degrees. That is, the diffraction and reflection unit 70 positions the multi-channel beam 21 (collimated by the optical collimation and focusing unit 20) and the multi-channel beam 22 (generated by the diffraction and reflection unit 70) in parallel on the optical collimation and focusing unit 20. Therefore, the aberration, which may be caused when multi-channel beams 21 and 22 are positioned on different axes, can be eliminated. In addition, a high resolving power and a high dynamic range can be obtained. In this way, the optical detection unit 60 can detect the optical intensity of each wavelength accurately.

Figure 2:
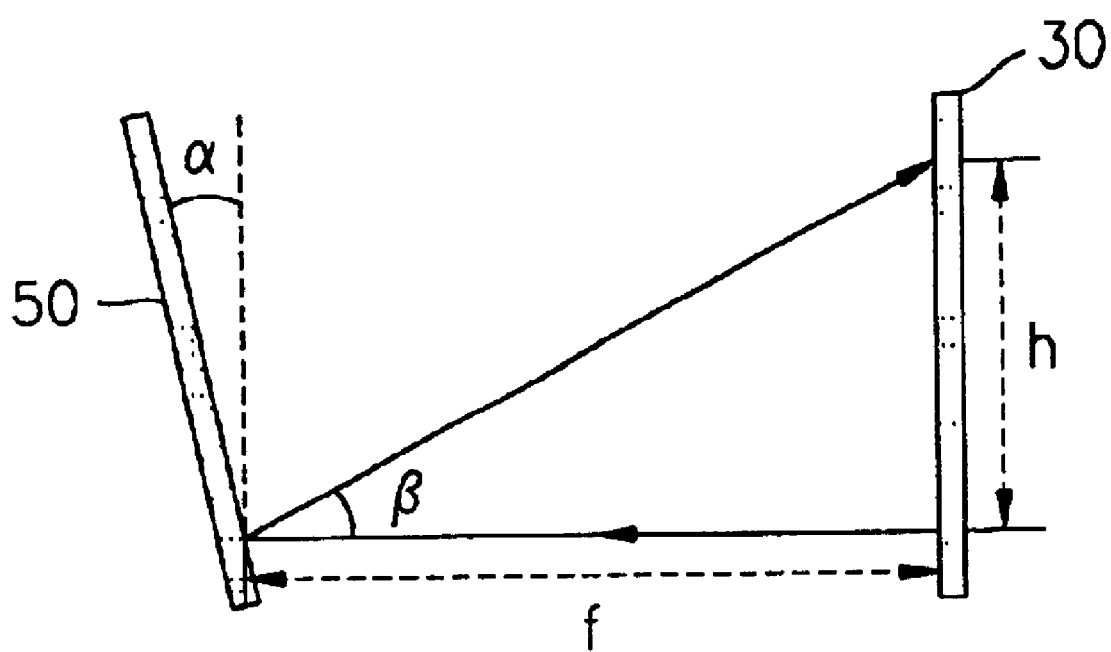
FIG. 2 shows the relation between the tilted degree ($\alpha$) of an optical reflection unit shown in FIG. 1 and the degree ($\beta$) of the multi-channel beam reflected by the optical reflection unit.

FIG. 2 shows the relation between the tilted degree (α) of an optical reflection unit 50 shown in FIG. 1 and the degree (β) of the multi-channel beam reflected by the optical reflection unit 50.

With reference to FIG. 2, the relation between the tilted degree (α) of an optical reflection unit 50 and the degree (β) of the multi-channel beam reflected by the optical reflection unit 50 is β=2α. The following formula 1 calculates the position on the diffraction grating where the multi-channel beam reflected by the optical reflection unit 50 and incident again on the wavelength divider 30 having the diffraction-grating surface is located.

$$\tan \beta = h/f \qquad \text{[Formula 1]}$$

That is, if the tilted degree α of the optical reflection unit 50 is controlled, the angle β of the multi-channel beam reflected by the optical reflection unit 50 can be controlled. As shown in Formula 1, the height h on the diffraction grating, where the multi-channel beam reflected by the optical reflection unit 50 is positioned, is dependent on the distance (f) between the diffraction grating and the optical reflection unit 50. Therefore, the multi-channel beam outputted from the optical collimation and focusing unit 20 to the diffraction grating is diffracted by the lower part of the diffraction grating. On the contrary, the multi-channel beam inputted from the optical reflection unit 50 to the diffraction grating is diffracted by the upper part of the diffraction grating again. For minimized aberration, it is important that the two multi-channel beams inputted to the diffraction grating should be positioned nearest to the center of the diffraction grating. To that end, it is necessary to adjust the tilted degree α of the optical reflection unit 50, and the distance between the wavelength divider 30 and the optical reflection unit 50.

Figure 3:
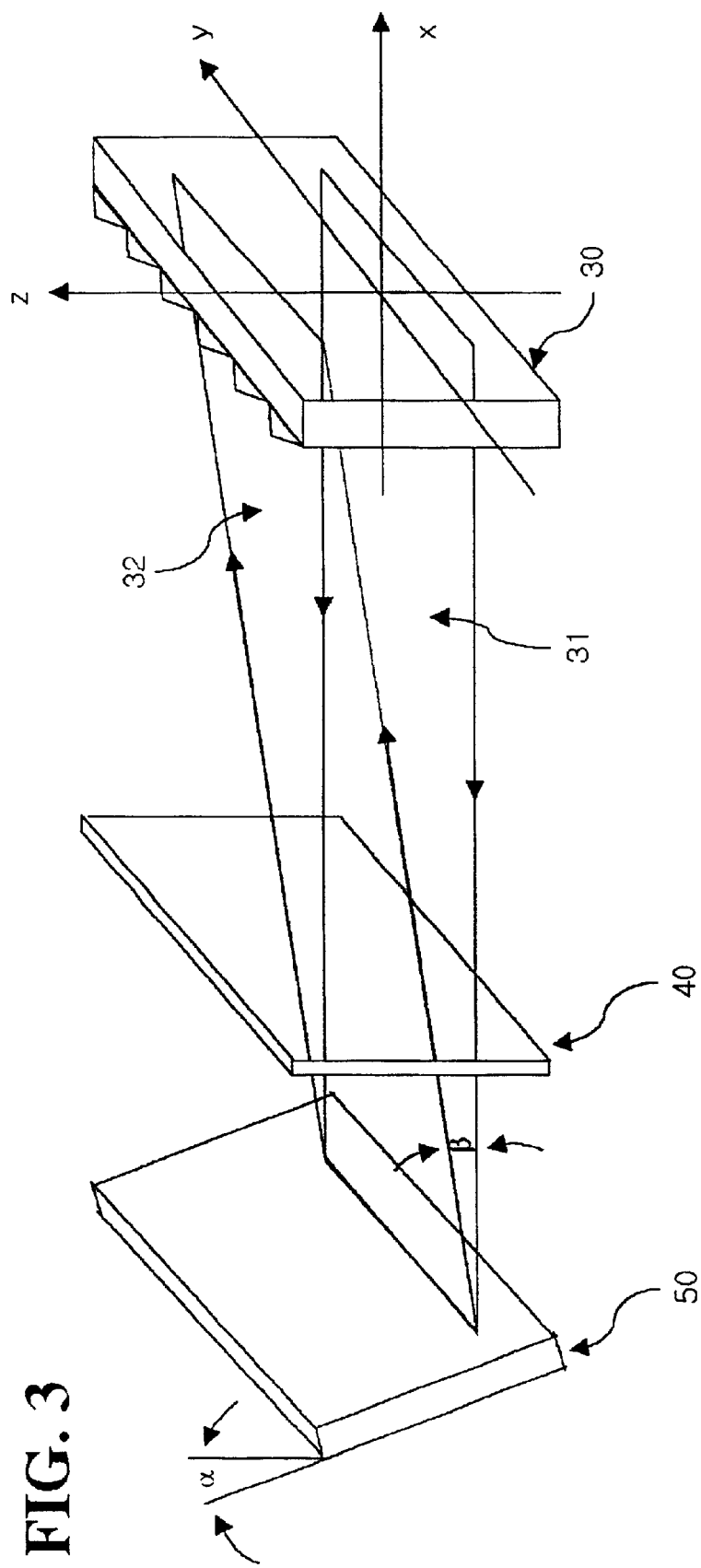
FIG. 3 shows the propagation paths of the multi-channel beam which is divided by wavelength by a wavelength divider shown in FIG. 1, and of the multi-channel beam which is incident again on the wavelength divider after being reflected by the optical reflection unit.

FIG. 3 shows the propagation paths of the multi-channel beam 31 which is divided by wavelength by a wavelength divider 30 shown in FIG. 1, and of the multi-channel beam 32 which is reflected by the optical reflection unit 50 and is incident again on the wavelength divider 30.

As shown in FIG. 3, the angle between the propagation path of the inputted multi-channel beam 31 and the optical reflection unit 50 is α. The optical reflection unit 50 reflects the multi-channel beam 31 incident from the polarization converter 40 by β degrees and inputs the multi-channel beam 32 to the wavelength divider 30. As a result, as shown in FIG. 3, the two multi-channel beams 32 and 31 inputted/outputted to/from the surface of the wavelength divider 30 are positioned on the same plane, that is, yz plane.

Figure 4:
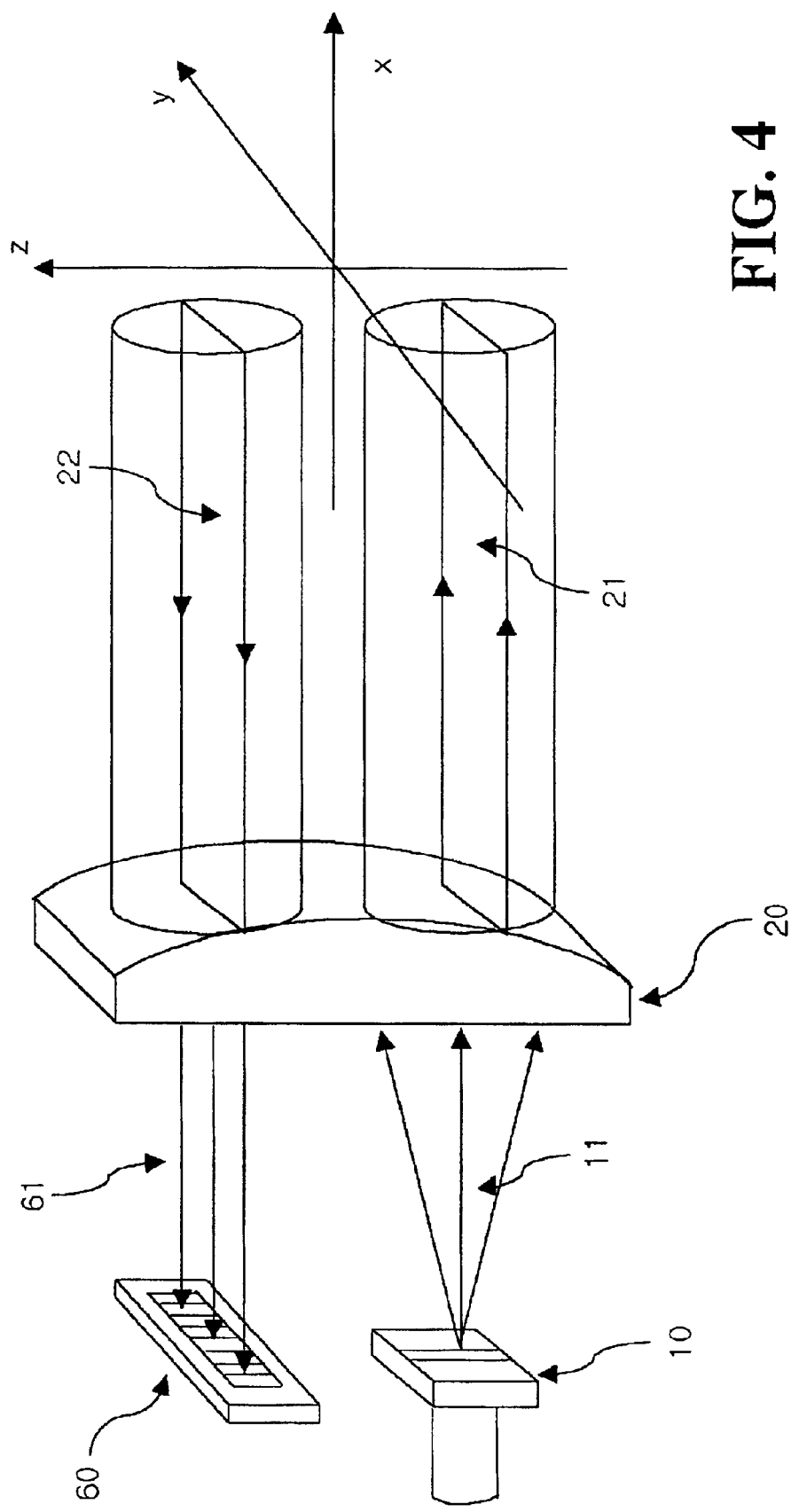
FIG. 4 shows the propagation paths of the multi-channel beam collimated by an optical collimation and focusing unit shown in FIG. 1, and of the multi-channel beam which is inputted to the optical collimation and focusing unit after divided by wavelength again by the wavelength divider.

FIG. 4 shows the propagation paths of the multi-channel beam 21 collimated by an optical collimation and focusing unit 20 shown in FIG. 1, and of the multi-channel beam 22 which is divided by wavelength again by the wavelength divider and is inputted to the optical collimation and focusing unit 20.

In FIG. 3, due to the optical reflection unit 50 tilted by α, the two multi-channel beams inputted/outputted to/from the surface of the wavelength divider 30 are positioned on the same plane, that is, yz plane. Therefore, as shown in FIG. 4, the multi-channel beam 21 collimated by the optical collimation and focusing unit 20 and inputted to the wavelength divider 30 and the multi-channel beam 22 divided by wavelength again by the wavelength divider 30 and inputted to the optical collimation and focusing unit 20 are positioned on the same plane of the optical collimation and focusing unit 20, that is, yz plane. Besides, the multi-channel beam 11 (inputted from the optical input unit 10 to the optical collimation and focusing unit 20) and the multi-channel beam 61 (focused on the optical detection unit 60 by the optical collimation and focusing unit 20) are positioned on the same plane of the optical collimation and focusing unit 20, that is, yz plane. Therefore, the impact of the aberration of the optical collimation and focusing unit 20 can be minimized. In addition the f-number of the two multi-channel beams 21 and 22 on the optical collimation and focusing unit 20 become identical.

Figure 5:
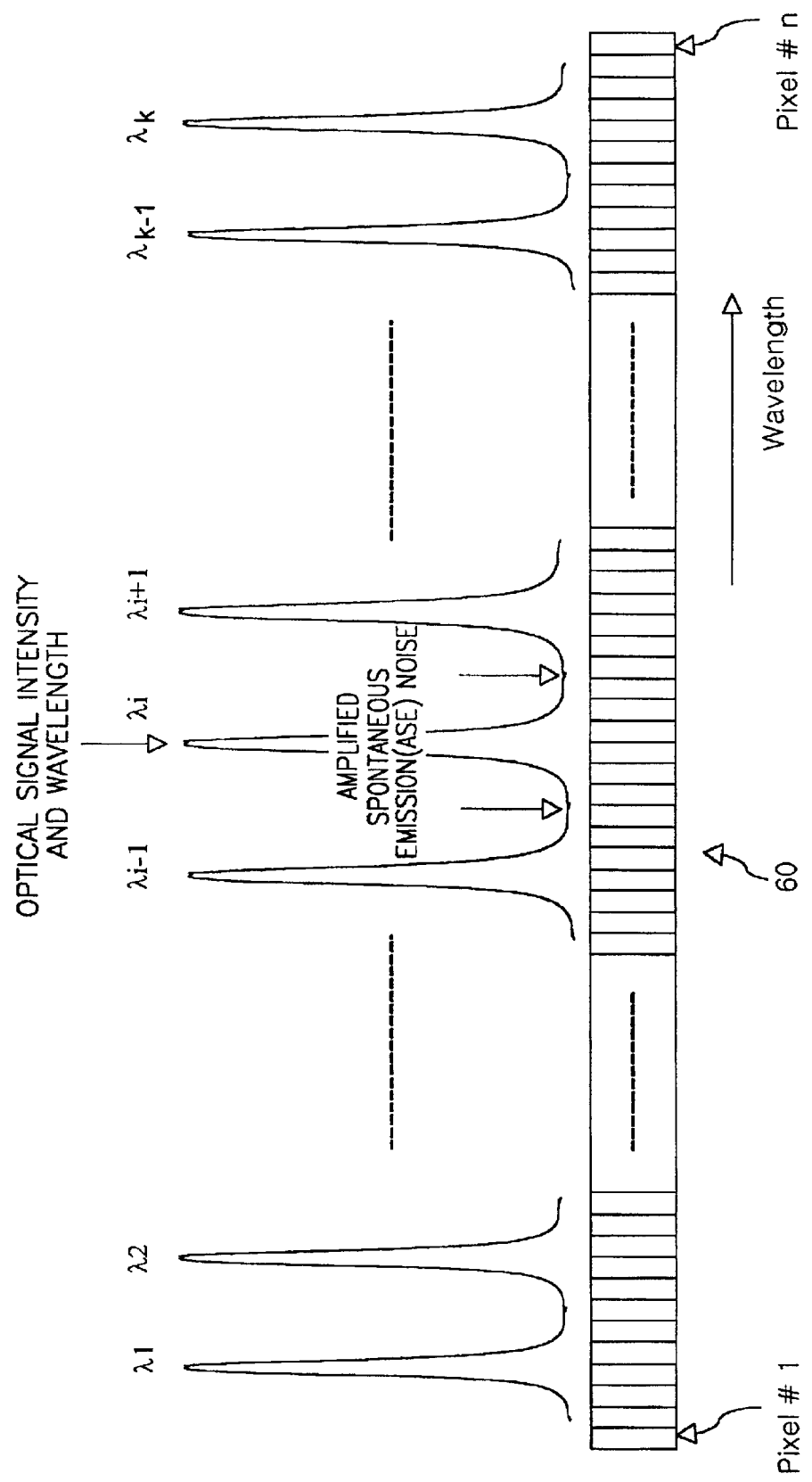
FIG. 5 shows how an optical detection unit measures each wavelength intensity of the multi-channel beam which is focused by wavelength by the optical collimation and focusing unit.

FIG. 5 shows how an optical detection unit 60 measures each wavelength intensity of the multi-channel beam which is focused by wavelength by the optical collimation and focusing unit 20.

With reference to FIG. 5, the optical detection unit 60 includes n pixels. The pixel locations correspond to the wavelengths of the multi-channel beam including k channel signals. The multi-channel beam is divided by wavelength by the wavelength divider 30. The optical collimation and focusing unit 20 focuses the multi-channel beam divided by wavelength on the optical detection unit 60. Each pixel of the optical detection unit 60 detects the optical intensity corresponding to each wavelength of the focused multi-channel beam. The optical detection unit 60 measures the intensity of the multi-channel beam by wavelength, and the optical signal-to-noise ratio by measuring the optical intensity corresponding to each wavelength and an amplified spontaneous emission (ASE) noise strength at the point between optical signals.

As described above, according to the optical signal performance monitoring apparatus and the method in the multi-channel optical transmission system, using the wavelength dividing element such as the diffraction grating and the photo diode array sensor, the intensity, the wavelength and the optical signal-to-noise ratio of the multi-channel optical signal by channel can be measured at the same time. In addition, due to the optical reflection unit 50 tilted by α, the multi-channel beam 21 (collimated by the optical collimation and focusing unit 20) and the multi-channel beam 22 (generated by the diffraction and reflection unit 70) are positioned on the same plane of the optical collimation and focusing unit 20. Therefore, the aberration, which may be caused when multi-channel beams 21 and 22 are positioned on different axes, can be eliminated. In addition, a high resolving power and a high dynamic range can be obtained. As a result, the optical signal performance monitoring apparatus according to the present invention can measure the optical signal performance of the multi-channel optical transmission system having the optical add drop multiplexer or the optical cross connector which can maximize the system performance and effectiveness.

As a result, the optical signal performance monitoring apparatus and the method according to the present invention in the multi-channel optical transmission system can measure the intensity, the wavelength and the optical signal-to-noise ratio of the multi-channel optical signal by channel simultaneously in real time. In addition, since the optical signal performance monitoring can minimize the impact caused by an aberration and maintain the same f-number in the optical system, a high resolving power and a high dynamic range are guaranteed.

Although specific embodiments of the invention have been described herein for illustrative purposes, various modifications and equivalents thereof can be made without departing from the spirit and scope of the invention, as will be recognized by those skilled in the relevant art. Accordingly, the invention is not limited to the disclosure, but instead its scope is to be determined entirely by the following claims.

What is claimed is:

1. An optical signal performance monitoring apparatus in a multi-channel optical transmission system, the optical signal performance monitoring apparatus comprising:

an optical input unit for controlling the spot size of an inputted multi-channel optical signal and generating a $1^{st}$ multi-channel beam;

a diffraction and reflection unit for diffracting and reflecting the $1^{st}$ multi-channel beam; and generating a $2^{nd}$ multi-channel beam which is divided by wavelength and is in parallel with the $1^{st}$ multi-channel beam;

an optical collimation and concentration unit for collimating the $1^{st}$ multi-channel beam and concentrating the $2^{nd}$ multi-channel beam which is divided by wavelength; and an optical detection unit for measuring the intensity of the $2^{nd}$ multi-channel beam focused by wavelength, and measuring the optical signal-to-noise ratio by measuring the optical intensity corresponding to each wavelength and an amplified spontaneous emission (ASE) noise strength at a point between optical signals.

2. The apparatus of claim 1 wherein the diffraction and reflection unit comprises:

a wavelength divider for generating a $3^{rd}$ multi-channel beam by dividing the multi-channel beam collimated by wavelength by the optical collimation and focusing unit, and generating the $2^{nd}$ multi-channel beam that is positioned in parallel with the $1^{st}$ multi-channel beam on the same plane by dividing again the multi-channel beam by wavelength;

a polarization converter for changing the state of polarization of the $3^{rd}$ multi-channel beam and the multi-channel beam reflected by the optical reflection unit; and an optical reflection unit for tilting by a $1^{st}$ predetermined angle and reflecting the $3^{rd}$ multi-channel beam inputted from the polarization converter by the $2^{nd}$ predetermined angle, and outputting the reflected multi-channel beam to the polarization converter.

3. The apparatus of claim 2, wherein the surface of the wavelength divider is the diffraction grating designed to divide and reflect or diffract the multi-channel beam incident on the grating by wavelength.

4. The apparatus of claim 3, wherein the multi-channel beam inputted from the optical collimation and focusing unit to the diffraction grating and the multi-channel beam inputted from the reflection unit to the diffraction grating are positioned nearest to the center of the diffraction grating by controlling the tilt of the optical reflection unit and the distance between the optical reflection unit and the wavelength divider.

5. The apparatus of claim 2, wherein the polarization converter is a quarter wave plate and converts the state of polarization of the multi-channel beam passing through the quarter wave plate by 45 degrees.

6. A method for monitoring an optical signal performance in e multi-channel optical transmission system includes:

(a) step of controlling the spot size of an inputted multi-channel optical signal and generating a $1^{st}$ multi-channel beam;

(b) step of collimating the $1^{st}$ multi-channel beam;

(c) step of diffracting and reflecting the $1^{st}$ collimated multi-channel beam, and generating a $2^{nd}$ multi-channel beam which is divided by wavelength and is in parallel with the $1^{st}$ collimated multi-channel beam on the same plane; and (d) step of focusing the $2^{nd}$ multi-channel beam, measuring the intensity of the 2 multi-channel beam focused by wavelength, and measuring an optical signal-to-noise ratio by measuring the optical intensity corresponding to each wavelength and an amplified spontaneous emission (ASE) noise strength at a point between optical signals.

7. The method of claim 6, wherein (c) step includes:

(c1) step of generating a $3^{rd}$ multi-channel beam by dividing and diffracting the $1^{st}$ multi-channel beam collimated by wavelength;

(c2) step of changing the state of polarization of the $3^{rd}$ multi-channel beam;

(c3) step of reflecting the $3^{rd}$ multi-channel beam changed the state of polarization in (c2) step by a predetermined reflection angle;

(c4) step of changing the state of polarization of the multi-channel beam reflected in (c3) step; and (c5) step of generating the $2^{nd}$ multi-channel beam by dividing and diffracting the multi-channel beam changed the state of polarization in (c4) step by wavelength.

8. The method of claim 7, wherein the state of polarization of the $3^{rd}$ multi-channel beam and the reflected multi-channel beam are changed by 45 degrees in (c2) and (c4) steps.

* * * * *